United States Patent [19]
Nishida et al.

[11] Patent Number: 4,714,947
[45] Date of Patent: Dec. 22, 1987

[54] CONTACT PRINTER FOR PHOTOSENSITIVE MATERIALS

[75] Inventors: Fumihiko Nishida; Seiji Nanri; Makoto Yahata, all of Kyoto, Japan

[73] Assignee: Dainippon Screen Mfg. Co., Ltd., Kyoto, Japan

[21] Appl. No.: 886,778

[22] Filed: Jul. 17, 1986

[30] Foreign Application Priority Data

Jul. 18, 1985 [JP] Japan .............. 60-110831[U]

[51] Int. Cl.⁴ .............................................. G03B 27/04
[52] U.S. Cl. ........................................ 355/95; 355/86; 355/87; 355/91
[58] Field of Search .................. 355/86, 91, 87, 95, 355/96

[56] References Cited

U.S. PATENT DOCUMENTS

3,147,683  9/1964  Hulen ................................... 355/87
4,159,176  6/1979  Masi ..................................... 355/86
4,580,892  4/1986  Nishida et al. ....................... 355/95

FOREIGN PATENT DOCUMENTS

60-10253  6/1983  Japan .

*Primary Examiner*—Monroe H. Hayes
*Attorney, Agent, or Firm*—Lowe, Price, LeBlanc, Becker & Shur

[57] ABSTRACT

A contact printer includes a printing table for mounting of photosensitive material thereon, a framework for supporting a light-transmitting plate, a packing, a conveyor belt for movement of an original in X and Y-directions, and an air-blowing nozzle and drive means for open and close operation of the framework. The framework is held at a position where it is in a slightly opened state during movement of the original, supported by the blown air in order to prevent the photosensitive material from being damaged and to insure accurate positioning of the original.

20 Claims, 6 Drawing Figures

CONTACT PRINTER FOR PHOTOSENSITIVE MATERIALS

BACKGROUND OF THE INVENTION

1. Field of the Invention

This invention relates to a contact printer for photosensitive material in which an original such as a film contacts a photosensitive material such as film, presensitized plate, or the like, and an image from the original is printed onto the photosensitive material and, more particularly, to a contact printer for multiduplication in which an image from the original is repeatedly printed on the photosensitive material.

2. History of the Prior Art

The applicant has previously disclosed a printing apparatus for multi-duplication in Japanese laid-open Patent Publication (unexamined) No. Sho 60-10253, in which an end of an original is fixed to a belt and moved in a plane in X and Y directions with respect to a photosensitive material for positioning thereof by movement of the belt with the original held on air by blowing air along the original.

According to this prior art contact printer, in spite of its contact formation, multi-duplication can be accurately performed even in the case of an original of large size or an original out of standard, e.g., with its dimension in one direction elongated.

A problem exists, however, in that when this prior printer is used to copy from an original with a length considerably larger than its width, the original cannot be held on the air and one end of the original is in contact with a surface of the photosensitive material unless air pressure blown to the original and hence the air flow rate are both relatively high. When the belt is moved under such circumstances, with contact between the original and the photosensitive material, it is possible for the original to be drawn along, even to the extent of damaging a film surface of the photosensitive material. Likewise, when this occurs, accuracy in positioning the original is affected.

SUMMARY OF THE INVENTION

Accordingly, in order to solve the above-discussed problem, there is provided a contact printer according to this invention comprising a printing table on which a photosensitive material is mounted, framework for supporting a light-transmitting plate, a packing disposed outside an effective printing area of the framework to form an airtight space between the printing table and the light-transmitting plate, a belt for moving an original in a plane, in X-direction and Y-direction in relation to the photosensitive material, nozzles for blowing air to a space between the original and the photosensitive material, and drive means for open and close operation of said framework between a first position where the framework is open and a second position where the airtight spacing is formed between the printing table and the light-transmitting plate. The printer is characterized in that during moving of said original, the framework is held at a third position where the framework is slightly open between the first and second positions to the extent of not affecting the movement of the original so that the original is positioned in such state by movement of the belt.

Since the air blown out of the nozzle flows in the form of a laminar flow through a space formed between the printing plate mounting the photosensitive material thereon and the framework supporting the light-transmitting plate, an action for enlarging the space between the original and the photosensitive material is increased and accordingly the original can be held on the air by smaller quantity of air when moving the original including one having a length larger than its width, and there is no possibility of damaging the photosensitive material and affecting the accuracy of positioning the original plate. Furthermore, the following advantages peculiar to a contact printer according to this invention are also insured:

(1) Since the framework is not completely open during moving of the original, such disadvantages as butting the frame work against an operator at the time of opening and closing it, putting a part of the operator's body between the printing table and the framework, etc., are considerably decreased.

(2) Since the framework is not completely open during moving of the original, the time necessary for completion of one cycle of multi-duplication is reduced by at least 5-10%.

DESCRIPTION OF THE PREFERRED EMBODIMENT

Figure 1:
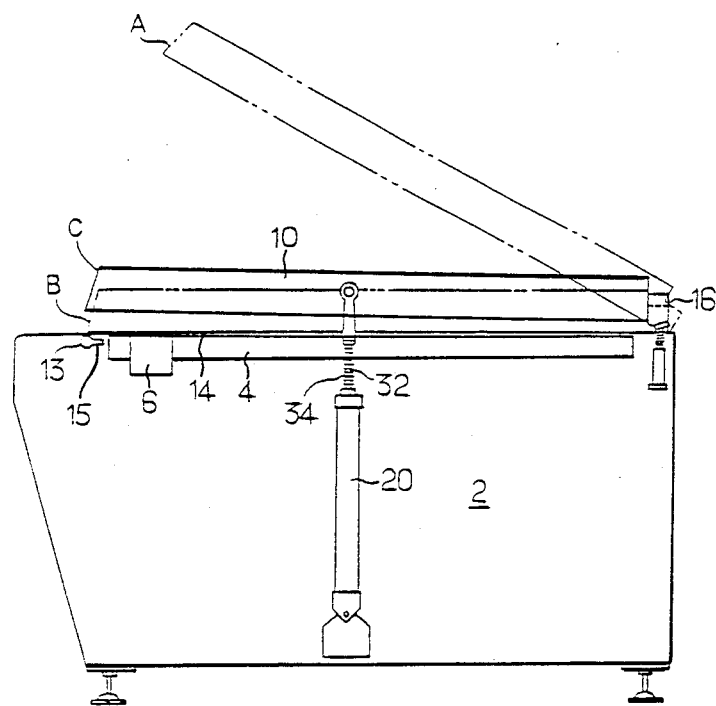
FIG. 1 is a side view of a contact printer according to an embodiment of this invention, with its side plate, light source, etc., removed.
Figure 2:
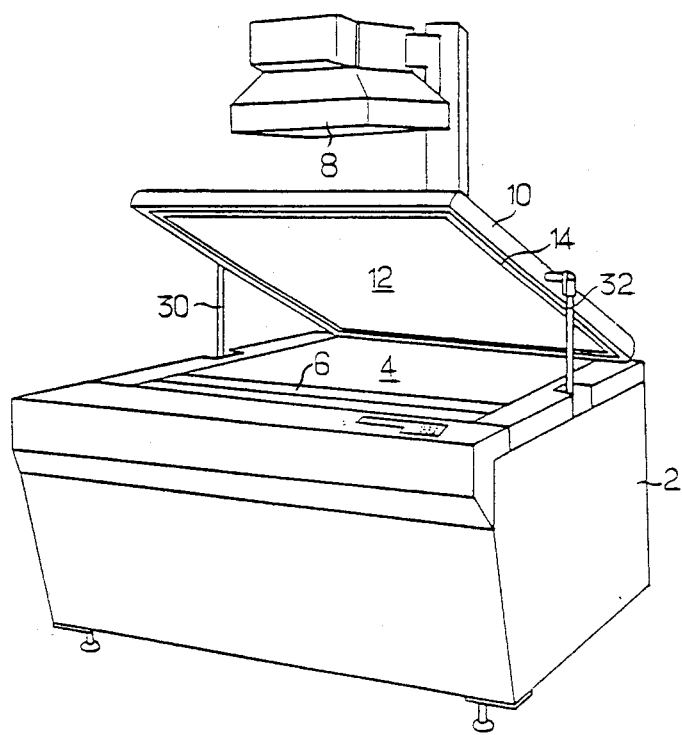
FIG. 2 is a perspective view of the contact printer of FIG. 1.
Figure 3:
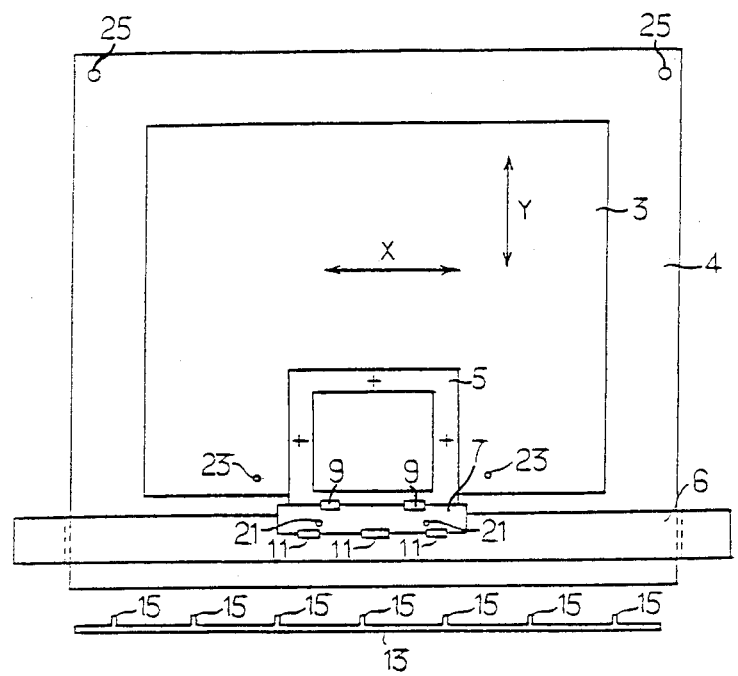
FIG. 3 is a plan view showing a printing table portion of the contact printer.

Referring now to the accompanying drawings, an embodiment of this invention is described.

In FIGS. 1-4, reference numeral 2 denotes a printer body, 8 denotes a light source, and 10 denotes a frame work for supporting a light transmitting plate 12 such as glass plate on the center thereof. A packing 14 is disposed on the lower side of the frame work 10 surrounding the light transmitting plate 12. Although not illustrated in the drawings, a masking device is disposed on the upper part of the light transmitting plate 12 on the frame work 10 to shade a portion not to be exposed.

Numeral 4 denotes a printing table on which a photosensitive material 3 such as presensitizing plate (PS plate) is positioned by a pin 23. Exhaust ports 25 connected to a vacuum pump (not shown), are formed on two places of an end portion of the table. Further, the printing table 4 is so arranged as to be lowered to a point indicated by two dot chain line in FIG. 4 when moving an original 5.

Numeral 6 is a belt for positioning the original 5, formed a metal of no more than 0.2 mm in thickness and stretched over and between pulleys 17, 19. The belt 6 moves in the Y-direction in FIG. 3 by a drive mechanism such as a screw (not shown) in the stretched state, and in the X-direction by rotation of the pulleys 17, 19. In the printing process, a guide film (7) on which the original is taped with a tape 9 is positioned by a pin 21 and taped to the belt 6 with one or more pieces of a tape 11.

Figure 6:
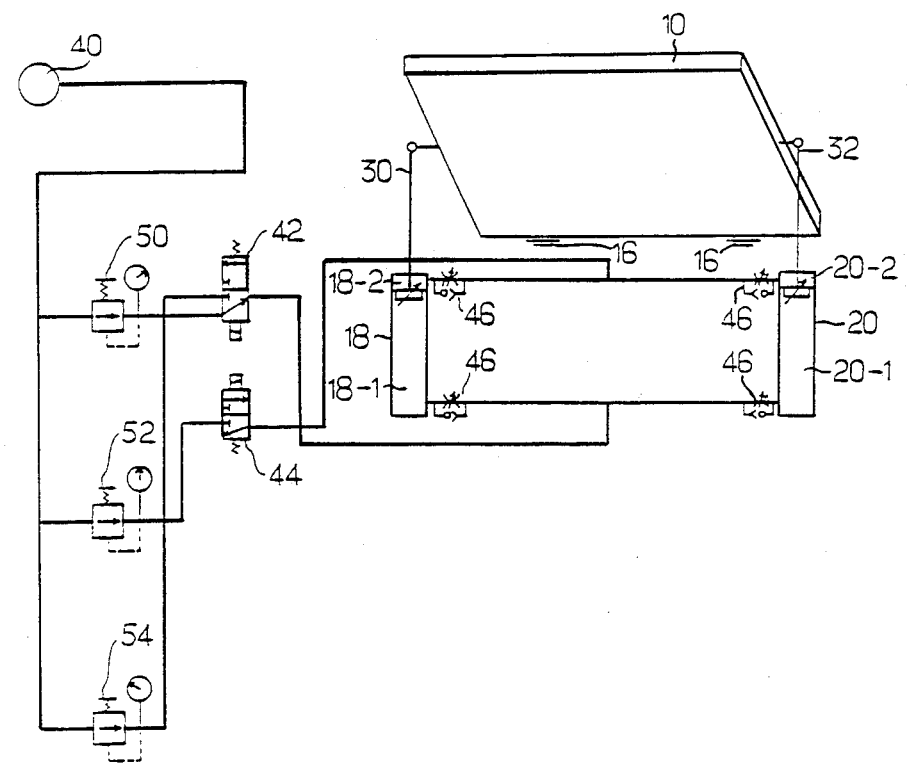
FIG. 6 is a circuit diagram of an air pressure control circuit for open and close operation of the frame work.

Numeral 13 is a tubular member with a plurality of nozzles 15 for blowing air to the lower side of the belt 6 with the original 5 thereon, nozzles 15 being connected to an air compressor 40 as schematically illustrated in FIG. 6.

The foregoing arrangement, as described hitherto, is almost the same as the disclosure of aforementioned Japanese laid-open Patent Publication (unexamined) No. Sho 60-10253 and detailed description of the latter is therefore omitted herein. Differences between this prior art and the present invention are discussed below.

An end of the frame work 10 is supported by hinge mechanisms 16 and the mid points of both sides are supported by air cylinders 18, 20 and springs 34 provided on peripheries of cylinder rods 30, 32 of the air cylinders so that open and close operation is performed among a first position (A), a second position (B) and a third position (C) by driving the air cylinders 18, 20.

The first position (A) is a position when the frame work 10 is completely open, and the second position (B) is a position when the frame work 10 is completely closed to the extent that an airtight space is formed among the printing table 4, the light transmitting plate 12 and the packing 14. The open and close operation of the frame work 10 between the third and second positions (C), (B), respectively is a vertical movement, and it is preferable that a distance between the lower side of the framework 10 and the upper side of the belt 6 in the third postion (C) is 0.5–10 cm. A distance between the lower side of the belt 6 and the upper side of the printing table 4 when carrying the original is also preferable to be 0.5–10 cm.

Figure 5:
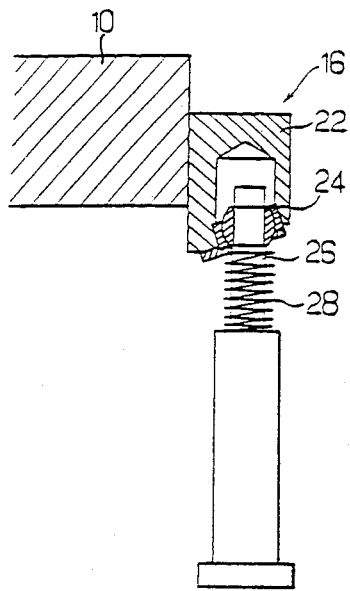
FIG. 5 is a sectional view of a hinge mechanism.

In FIG. 5, showing a sectional view of a hinge mechanism 16, a hinge 2 fixed to the frame work 10 is connected to a shaft 26 to be movable in vertical direction through a spherical bearing 24, and is supported by a spring 28 provided on the periphery of the shaft 26.

In FIG. 6, showing a circuit diagram of an air pressure control circuit for open and close operation of the frame work 10, numeral 40 is an air compressor, 42 and 44 are electromagnetic valves, and 46 is a flow regulating valve. Numeral 50 is a pressure-regulating valve to supply first chambers 18-1 and 20-1 of the air cylinders 18, 20, respectively, high pressure air necessary for opening the frame work 10 up to the first position (A), and the pressure of the air is set to 6 kg/cm$^2$, for example.

Numeral 52 is a pressure-regulating valve to supply second chambers 18-2, 20-2 of the air cylinders 18, 20 with the air pressure that is necessary to lower the frame work 10 from the third position (C) to the second position (B) and to thereby form an airtight space between the light transmitting plate 12 and the printing table 4. This airtight space is surrounded by the packing 14, and the air pressure is set to 1.5 kg/cm$^2$, for example.

Numeral 54 is a pressure-regulating valve to supply the first chambers 18-1, 20-1 of the air cylinders 18, 20 with air at a pressure that is a little lower than the pressure required to balance the load of the framework 10 at the time of closing it, and the pressure is set to 1.5 kg/cm$^2$, for example, according to the weight of the framework 10.

Described hereunder is a function exhibited by this printer.

Air pressure of 6 kg/cm$^2$ is fed to the first chambers 18-1, 20-1 of the air cylinders 18, 20 by switching the electro-magnetic valve 42 to the state shown in FIG. 6, and the frame work 10 is opened to stop at the first position (A). Under such a state, the photosensitive material 3 is positioned by the pin 23 to be mounted on the printing table 4, while the original 5 is positioned by the pin 21 passed through the guide film 7 to be mounted on the belt (6). After completion of the positioning, the pins 21, 23 are removed.

When the air pressure in the first chambers 18-1, 20-1 of the air cylinders 18, 20 is decreased to 1.5 kg/cm$^2$ by switching the electro-magnetic valve 42, the framework 10 begins gradually to open by the difference between a downward force due to load of the framework 10 and an upward force due to actuation by the air cylinders 18, 20. When the framework 10 is closed to the third position (C), the downward force due to the load of the framework 10 balances the sum of the upward force due to the air cylinders 18, 20 and the upward force due to the springs 28, 34, and accordingly the framework 10 does not stop a completely horizontal state but stops in a slightly inclined state with its front side a little higher than the rear side as best seen in FIG. 1.

Figure 4:
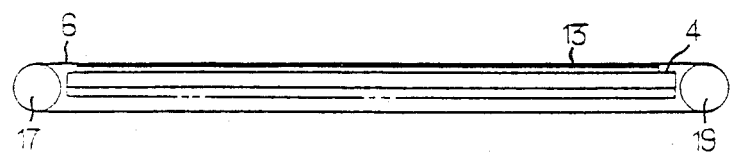
FIG. 4 is a front elevation view of the printing table portion shown in FIG. 3.

When printing table 4 is lowered under such a state, to the position indicated by two dot chain line in FIG. 4, and air is blown beneath the original 5, the original 5 is supported on the air with its front end supported on the belt 6. Then, the belt 6 is moved in the X and Y directions according to the command of a microcomputer of a NC device, so that the original 5 is positioned at the first printing position on the photosensitive material 3. Now since the frame work 10 is closed to the position where it is not affecting the positioning of the original 5 and the air blown out of the nozzles 15 flows in the form of a laminar flow through the space between the glass plate 12 supported by the framework 10 and the printing table 4 is lowered to the position indicated by two dot chain line in FIG. 4, the original 5 can be held on the air with a relatively small air flow. Hence there is no possibility of drawing the end of the original 5 to where it can be scratching the adjacent surface of the photosensitive material 3.

During the positioning of the original 5 in relation to the photosensitive material 3, the air blowing out of the nozzles 15 is stopped and the printing table 4 is elevated up to the position indicated by the solid line in FIG. 4. When electro-magnetic valve 44 is switched from the position of FIG. 6 to supply second chambers (18-2), 20-2 of the air cylinders 18, 20 with air at a pressure is 4 kg/cm$^2$, the frame work 10 lowers from the third position (C) to the second position (B) against the force of the spring springs 28, 34 due to the difference in pressure between the first and second chambers 18-1, 20-1, 18-2, 20-2, and this brings the packing 14 into contact with the printing table 4.

The air in the airtighted space formed by the glass plate 12, the printing table 4 and the packing 14 is then exhausted from the exhaust port 25 so as to bring the glass plate 12 into contact with the printing table 4 as well as the original 5 with the photosensitive material 3, both being located therebetween. At the same time, portions not required to be exposed, other than the original 5 are shaded by a masking device (not illustrated). After complete contact between the original 5 and the photosensitive material 3 is obtained, the light source 8 is lit and the printing function is performed.

After completing of the printing, the framework 10 is lifted to its third position (C), then the printing table 4 is lowered to the position indicated by the two dot chain line in FIG. 4, and air is blown out of the nozzles 15 to again hold the original 5 on the air. Original 5 is then carried to the next printing position by driving of the conveyor belt 6, and the aforesaid operations are repeated for multi-duplication. After completion of the multi-duplication as scheduled, electro-magnetic valves 42, 44 are switched to the position shown in FIG. 6 to open the framework 10 up to its first position (A), and the original 5 and the photosensitive material 3 are both removed.

In the foregoing embodiment, the open and close operation of framework 10 between its first position (A) and its third position (C) is a turning movement around the hinge mechanism 16, while the open and close operation between the third position C and the second position (B) is a vertical movement, but it is also possible to make these two movements either by the turning movement or by the vertical movement only.

In the event that the framework 10 is moved by a turning movement between the third position (C) and the second position (B), an opened angle of the framework 10 in the third position is in the range 1°-10°, although it depends on the size of the framework 10. If framework 10 is moved by both turning and vertical movements, the opened angle of the framework 10 at the third position (C) and the distance between the lower side of the framework 10 and the upper side of the belt 6 can be adequately established, based on the aforesaid range 1°-10° by considering the extent of the vertical movement of the framework 10.

We claim:

1. A contact printer for printing from an original to photosensitive material, comprising:
   a printing table for mounting the photosensitive material thereon, said table being adapted to move up and down;
   a light source for exposing said photosensitive material through the original;
   a light transmitting plate member having an effective printing area;
   a frame member for supporting said light transmitting plate member;
   a packing member disposed to be outside said effective area of said light transmitting plate member, for defining an airtight space between said printing table and said light transmitting plate member;
   original moving means for moving said original in a plane adjacent to said printing table orthogonally in X-direction and Y-direction relative to said photosensitive material;
   air supply means for blowing air into a space between said original and said photosensitive material to provide a laminar flow of air therein; and
   frame member moving means for opening and closing said frame member relative to said printing table, said frame member moving means being adapted for moving said frame member between a first position at which said frame member is opened and a second position at which said airtight space is defined by said printing table, said light transmitting plate member, and said packing member, and for holding said frame member at a third position at which said frame member is slightly opened to be between said first and second positions so as to define a corresponding space between said original film and said photosensitive material after said printing table is moved downward, whereby said original can be moved in X-direction and Y-direction by said original moving means while said original is supported in said space by said laminar flow of air blown by said air supply means so that contact between the moving original and the photosensitive material is avoided.

2. A contact printer according to claim 1, wherein:
said original moving means comprises a belt stretched over and between two pulleys and driven by rotation thereof in one of said X and Y directions, and also comprising means for moving said belt and pulleys together in the other of said X and Y directions, thereby to move said original.

3. A contact printer according to claim 2, wherein:
said belt comprises metal not more than 0.2 mm thick.

4. A contact printer according to claim 3, wherein:
said belt further comprises means for positioning an original with respect to a portion of said belt for attachment thereat.

5. A contact printer according to claim 4, wherein:
said original positioning means comprises a pin temporarily insertable into said belt.

6. A contact printer according to claim 1, wherein:
said air supply means comprises a nozzle for directing said blown air into said space between said original and said photosensitive material.

7. A contact printer according to claim 1, wherein:
said air supply means comprises a plurality of nozzles disposed on a tubular member conveying air to said nozzles.

8. A contact printer according to claim 7, wherein:
said original moving means comprises a belt stretched over and between two pulleys and driven by rotation thereof in one of said X and Y directions, and also comprising means for moving said belt and pulleys together in the other of said X and Y directions, thereby to move said original.

9. A contact printer according to claim 8, wherein:
said plurality of nozzles direct said air flow to the underside of said belt and said original that is to be moved thereby.

10. A contact printer according to claim 1, wherein:
said frame member moving means comprises means for rotatably supporting a side of said frame member with respect to said printing table.

11. A contact printer according to claim 10, wherein:
said frame member moving means further comprises means for allowing vertical movement of said supported side thereof.

12. A contact printer according to claim 10, wherein:
said frame member moving means further comprises means for applying a lifting force to said frame member at a distance from said supported side, whereby said rotation of said frame member is facilitated.

13. A contact printer according to claim 12, wherein:
said means for rotatably supporting said frame member also comprises means for allowing vertical movement of said supported side thereof.

14. A contact printer according to claim 12, wherein:
said means for applying said lifting force includes an air cylinder utilizing compressed air to provide said lifting force.

15. A contact printer according to claim 13, wherein:
said means for applying said lifting force includes an air cylinder utilizing compressed air to provide said lifting force.

16. A contact printer according to claim 14, wherein:
said air cylinder is capable of providing a pressing force in a direction opposite to the direction of said lifting force.

17. A contact printer according to claim 15, wherein:
said air cylinder is capable of providing a pressing force in a direction opposite to the direction of said lifting force.

18. A contact printer according to claim 16, wherein:
said frame member rotates between 1° and 10° in moving from said second position to said third position.

19. A contact printer according to claim 17, wherein:
said frame member rotates between 1° and 10° in moving from said second position to said third position.

20. A contact printer according to claim 19, wherein:
said original moving means comprises a belt stretched over and between two pulleys and driven by rotation thereof in one of said X and Y directions, and also comprising means for moving said belt and pulleys together in the other of said X and Y directions, thereby to move said original;

said belt further comprises means for positioning an original with respect to a portion of said belt for attachment thereat; and said air supply means comprises a plurality of nozzles disposed on a tubular member conveying air to said nozzles.

* * * * *